United States Patent
Maranski et al.

(10) Patent No.: US 10,577,967 B2
(45) Date of Patent: Mar. 3, 2020

(54) BEARING BUMPER FOR BLADE OUT EVENTS

(71) Applicant: General Electric Company, Schenectady, NY (US)

(72) Inventors: Tomasz Maranski, Warsaw (PL); Gregory Crum, Greenville, SC (US); Karol Filip Leszczynski, Warsaw (PL); Daniel Ozga, Warsaw (PL)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 15/988,217

(22) Filed: May 24, 2018

(65) Prior Publication Data

US 2018/0347393 A1    Dec. 6, 2018

(30) Foreign Application Priority Data

Jun. 5, 2017    (EP) .................................... 17461545

(51) Int. Cl.
*F01D 21/04*    (2006.01)
*F02C 7/06*    (2006.01)

(52) U.S. Cl.
CPC .............. *F01D 21/045* (2013.01); *F02C 7/06* (2013.01); *F05D 2220/32* (2013.01); *F05D 2240/14* (2013.01); *F05D 2240/50* (2013.01); *F05D 2240/91* (2013.01); *F05D 2260/30* (2013.01); *F05D 2300/171* (2013.01)

(58) Field of Classification Search
None
See application file for complete search history.

(56) References Cited

U.S. PATENT DOCUMENTS

| | | | |
|---|---|---|---|
| 6,325,546 B1 | 12/2001 | Storace | |
| 6,719,524 B2* | 4/2004 | Nguyen | F01D 9/065 415/1 |
| 8,740,550 B2* | 6/2014 | Tanioka | F01D 5/081 415/116 |
| 8,888,442 B2* | 11/2014 | Bharath | F01D 9/041 29/557 |
| 9,644,494 B2* | 5/2017 | Hashimoto | F01D 25/14 |
| 10,330,011 B2* | 6/2019 | Chuong | F01D 25/30 |
| 10,378,370 B2* | 8/2019 | Budnick | F01D 25/24 |
| 2015/0176427 A1 | 6/2015 | Denis et al. | |

(Continued)

FOREIGN PATENT DOCUMENTS

| | | |
|---|---|---|
| EP | 2 065 569 A2 | 6/2009 |
| EP | 2 514 928 A2 | 10/2012 |
| WO | 2013/163078 A1 | 10/2013 |

OTHER PUBLICATIONS

Extended European Search Report and Opinion issued in connection with corresponding EP Application No. 17461545.0 dated Nov. 15, 2017.

*Primary Examiner* — Michael Lebentritt
(74) *Attorney, Agent, or Firm* — Charlotte C. Wilson; James W. Pemrick

(57) ABSTRACT

This disclosure provides assemblies for providing a bumper between an exhaust frame and a bearing housing in a gas turbine. The bumper or bumpers have an attachment surface for attaching to the exhaust frame and a bearing contact surface that engages the bearing housing during a blade out event.

20 Claims, 5 Drawing Sheets

(56) References Cited

U.S. PATENT DOCUMENTS

2015/0337682 A1* 11/2015 Yeager .................... F01D 9/065
                   415/1
2017/0370283 A1* 12/2017 Dynak ...................... F02C 3/04
2018/0149085 A1* 5/2018 Chennoju ................. F02C 7/18

* cited by examiner

BEARING BUMPER FOR BLADE OUT EVENTS

BACKGROUND

The disclosure relates generally to turbomachine bearing configurations, and more particularly, to turbomachine bearing configurations for limiting deflections and stresses during blade out events.

A variety of turbomachines, including engine fans, compressors, and turbines, include airfoils or blades in a balanced configurations around a shaft. Many of these turbomachines require that the machine demonstrate the ability to survive a blade failure at operational revolutions per minute (rpm) for some period of time or during a controlled shutdown period. Containment of high speed particles and limiting the failure of mounting attachments for the blades are important criteria for making it through these blade out events. In addition, limiting deflection of the shaft and preventing undue stress or failure in other parts of the gas turbine, such as the exhaust frame, that surround and position the shaft are also important. The configuration of the bearing between the shaft and the exhaust frame may be a relevant factor in limiting shaft deflection and resulting stresses in the exhaust frame and elsewhere. Ideally, blade loss should be limited to the initial failed or released blade. If the imbalance and resulting stresses become too great, loss of the entire turbomachine can result.

In some configurations, an exhaust frame surrounds a bearing that guides the shaft through the exhaust frame. The exhaust frame includes an inner barrel and outer barrel and connecting struts. During a blade out event, the imbalance from the remaining rotating blades in the turbomachine is translated through the shaft and into the bearing and exhaust frame. If those stresses become too great, deformation and failure of the bearing housing and/or the bolts holding the exhaust frame to the bearing housing can result, which may enable catastrophic deflection of the shaft.

SUMMARY

A first aspect of this disclosure provides a gas turbine assembly with a bearing bumper for blade out events. An exhaust frame has an inner cylinder, an outer cylinder, and a plurality of struts extending between the inner cylinder and the outer cylinder. A bearing housing is disposed concentrically within the inner cylinder of the exhaust frame surrounding a shaft and operatively coupled to the exhaust frame. At least one primary attachment member couples the exhaust frame to the bearing housing. A bumper assembly is disposed between an interior surface of the exhaust frame and an exterior surface of the bearing housing. The bumper assembly has an attachment surface attached to the exhaust frame and a bumper impact surface that engages the bearing housing during a blade out event.

A second aspect of the disclosure provides an exhaust frame assembly with a bearing bumper for blade out events. An exhaust frame has an inner cylinder, an outer cylinder, and a plurality of struts extending between the inner cylinder and the outer cylinder. The exhaust frame defines an interior space for receiving a bearing housing. At least one primary attachment member couples the exhaust frame to the bearing housing. A bumper assembly is disposed on an interior surface of the exhaust frame and extends into the interior space. The bumper assembly has an attachment surface attached to the exhaust frame and a bumper impact surface that engages the bearing housing during a blade out event.

A third aspect of the disclosure provides a bumper assembly for protecting a bearing during a blade out event. A bumper body has an attachment surface for attaching to an exhaust frame and a bumper impact surface that engages a bearing housing during a blade out event. A plurality of bumper attachment members may be used to attach the bumper assembly to the exhaust frame. A shim member may be positioned adjacent the bumper impact surface between the bumper impact surface and the bearing housing.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
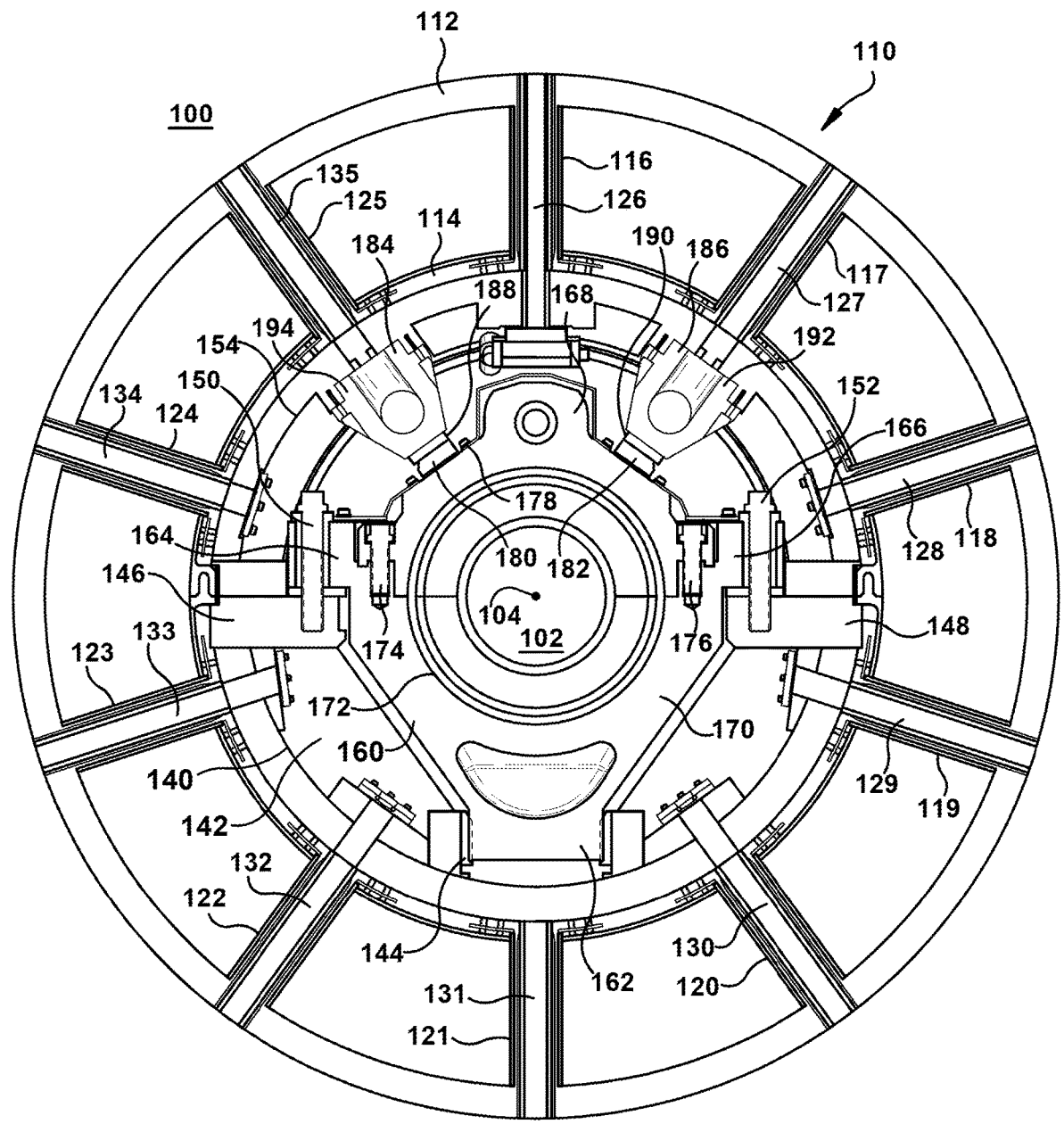
FIG. 1 shows an axial view of a portion of an example gas turbine.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In some embodiments, a turbomachine, such as a gas turbine, may include an exhaust frame arranged around a central rotating shaft. The exhaust frame may include an inner cylinder, an outer cylinder, and a plurality struts between the inner cylinder and outer cylinder. The interface between the exhaust frame and the rotating shaft may include a bearing that supports and positions the shaft. The bearing may be located concentrically within the exhaust frame. The bearing may include a bearing housing that provides a plurality of mechanical interface points with the exhaust frame, including one or more primary attachment members, such as bolts, securing the exhaust frame to the bearing housing. During a normal operating state, fluid flow across the airfoil blades in the turbomachine creates a substantially balanced rotational force in the shaft and the bearing. Primary attachment members, and other interface points are engineered to translate minor imbalances, vibration, and similar forces into the exhaust frame without undue stress or risk of failure. When an airfoil blade is damaged or detaches from its mounting to the rotor, it may be referred to as a blade out event and creates imbalance and irregular stresses. During a blade out event, one or more bumper assemblies between the exhaust frame and the bearing housing may provide a dynamic and alternate force transfer path between the exhaust frame and the bearing housing to reduce the stress on the primary attachment members. The bumper assemblies may be attached to the exhaust frame on one side and unattached on an opposite side that engages with the bearing housing. During the normal operating state, there may be a gap between the bumper assemblies and the bearing housing. In some embodiments, the gap may be filled with a shim member to assist in a secure fit between exhaust frame and bearing housing during the normal operating state, but enabling the bumper contact to move laterally during a blade out event.

FIG. 1 depicts a portion of an example gas turbine assembly 100. The portion of the gas turbine assembly 110 shown includes exhaust frame 110 around shaft 102. In some embodiments, gas turbine assembly 100 may include a compressor (not shown), a combustor (not shown), and a turbine section (not shown) including exhaust frame 110. The shaft 102 may be operatively connected to a load, such as a generator (not shown). The turbine section may include a plurality of airfoil blades (not shown) operatively attached to shaft 102. The plurality of airfoil blades may be arranged along axis 104 of shaft 102 in a number of stages (not shown), each stage including a plurality of evenly spaced airfoil blades that provide a substantially balanced rotational force on shaft 102 during normal operations. Substantial damage or detachment of an airfoil blade may create a period of substantial imbalance referred to as a blade out event and will generally require controlled shut down of the gas turbine. Normal operation of the gas turbine may include consumption of fuel to generate one or more energy outputs to other systems at a generally steady-state RPM, as well as transitions between desired operating speeds.

Exhaust frame 110 may include an outer cylinder 112 (also referred to as an outer barrel) an inner cylinder 114 (also referred to as an inner barrel) that are concentrically arranged around axis 104. Outer cylinder 112 may be spaced from and connected to inner cylinder 114 by a plurality of struts 116, 117, 118, 119, 120, 121, 122, 123, 124, 125 intended to support and position inner cylinder 114 around shaft 102. In some embodiments, outer cylinder 112 and inner cylinder 114 may be composed of a plurality of subcomponents and may engage with one or more adjacent portions or components of the turbine section of gas turbine assembly 100. In the example shown, struts 116, 117, 118, 119, 120, 121, 122, 123, 124, 125 extend through openings in inner cylinder 114 and are anchored to various surfaces within inner cylinder 114. Struts 116, 117, 118, 119, 120, 121, 122, 123, 124, 125 may each include cooling channels 126, 127, 128, 129, 130, 131, 132, 133, 134, 135 that receive cooling air during operations of gas turbine assembly 100 to prevent overheating and related stress to 116, 117, 118, 119, 120, 121, 122, 123, 124, 125. Strut interior cooling channels 126, 127, 128, 129, 130, 131, 132, 133, 134, 135 may each connect to one or more exhaust frame cooling channels to receive a cooling fluid, such as air below the temperature of the exhaust gas of the operating turbine.

Inner cylinder 114 may include a cylindrical wall 140. Cylindrical wall 140 may have varying layers, thicknesses, and features related to a number of interface, stability, and other design considerations depending on the overall design of exhaust frame 110 and gas turbine assembly 100. Cylindrical wall 140 may define an interior space 142 that accommodates at least a portion of a bearing assembly 160 that surrounds and engages shaft 102. Bearing assembly 160 may not be cylindrical in shape. In some embodiments, interior space 142 may be defined by positioning features for receiving bearing assembly 160. For example, interior space 142 may be defined by a base channel 144 for receiving a base extension 162 of bearing assembly 160. Interior space 142 may be defined by mounting plates 146, 148 into which the primary attachment members 150, 152 between exhaust frame 110 and bearing assembly 160 are anchored. For example, primary attachment members 150, 152 may include a plurality of threaded bolt assemblies inserted into threaded holes in mounting plates 146, 148. Other mechanical attachment members, such as clamps, pins, rivets, or other members for fixedly attaching adjacent metal members may also be possible. Bearing assembly 160 may include mounting flanges 164, 166 for engaging primary attachment members 150, 152, such as through holes that accommodate threaded bolt assemblies. Interior space 142 may be further defined by an interior surface 154 of cylindrical wall 140 incorporating one or more features for engaging bearing assembly 160 and other components within inner cylinder 114.

Bearing assembly 160 may be inserted into interior space 142 and secured by primary attachment members 150, 152 through mounting flanges 164, 166. Bearing assembly 160 may include a split bearing housing with an upper housing portion 168, and a lower housing portion 170 split along a diameter of shaft 102 and defining the cylindrical shaft space 172 between them. Upper housing portion 168 may attach to lower housing portion 170 using mechanical attachment members 174, 176. For example, mechanical attachment members 174, 176 may be bolts passing through holes in upper housing portion 168 and into threaded holes in lower housing portion 170. Lower housing portion 170 may include base extension 162 and mounting flanges 164, 166 and define the majority of contact points between bearing assembly 160 and inner cylinder 114 of exhaust frame 110. As a result, stresses during a blade out event, particularly upward radial forces into upper housing portion 168, may create substantial stress on mechanical attachment members 174, 176 holding upper housing portion 168 to lower housing portion 170, as well as primary attachment members 150, 152 between bearing assembly 150 and inner cylinder 114. A counteracting force on upper housing portion 168 that enables transfer of force into the upper portion of exhaust frame 110 may reduce stress in the attachment members and assist in preventing catastrophic failure of bearing assembly 160 during a blade out event, without requiring the overspecification of the diameters, number, or other strength characteristics of the attachment members and/or their interface points. Upper housing portion 168 may define at least a portion of bearing exterior surface 178, which is the surface of bearing assembly 150 facing interior surface 154 of cylindrical wall 140.

Bearing bumpers 184, 186 may provide a force transfer path from upper housing portion 168 to an upper portion of exhaust frame 110. For example, bearing bumpers 184, 186 may be attached to interior surface 154 of inner cylinder 114 and aligned with struts 117, 125 to enable force transfer from bearing assembly 160 into inner cylinder 114 and outer cylinder 112. In other embodiments, a single bearing bumper aligned with strut 116 or three bearing bumpers aligned with struts 116, 117, 125 may also be possible. It will be readily understood that other numbers of bearing bumpers greater than three may also be possible depending on the size and configuration of the exhaust frame, and some bearing bumpers may operate without direct alignment with one or more exhaust frame struts. Bearing bumpers 184, 186 are aligned with contact plates 180, 182 on bearing exterior surface 178 to transfer force between upper housing portion 168 and bearing bumpers 184, 186 during a blade out event. In some embodiments, bearing bumpers 184, 186 are not attached to upper housing portion 168 and may accommodate lateral movement along the impact surfaces between bearing bumpers 184, 186 and upper housing portion 168. The unattached impact surfaces may be in frictional contact during normal operation of gas turbine assembly 100. Bearing bumpers 184, 186 and contact plates 180, 182 may define gaps between the adjacent impact surfaces. In some embodiments, shims 188, 190 may be provided in the gaps between the adjacent impact surfaces to minimize deflection of bearing assembly 160 and maintain contact force between the adjacent impact surfaces even during normal operation of gas turbine assembly. For example, shims 188, 190 may be made of steel, cast iron, or another rigid material. Bearing bumpers 184, 186 may include bumper bodies 192, 194 extending between the impact surface with upper housing portion 168 and the attachment surfaces with inner cylinder 114 and transferring forces there between. Example configurations for bearing bumpers 184, 186 and their interfaces with bearing assembly 160 and inner cylinder 114 will be further described below.

Figure 2:
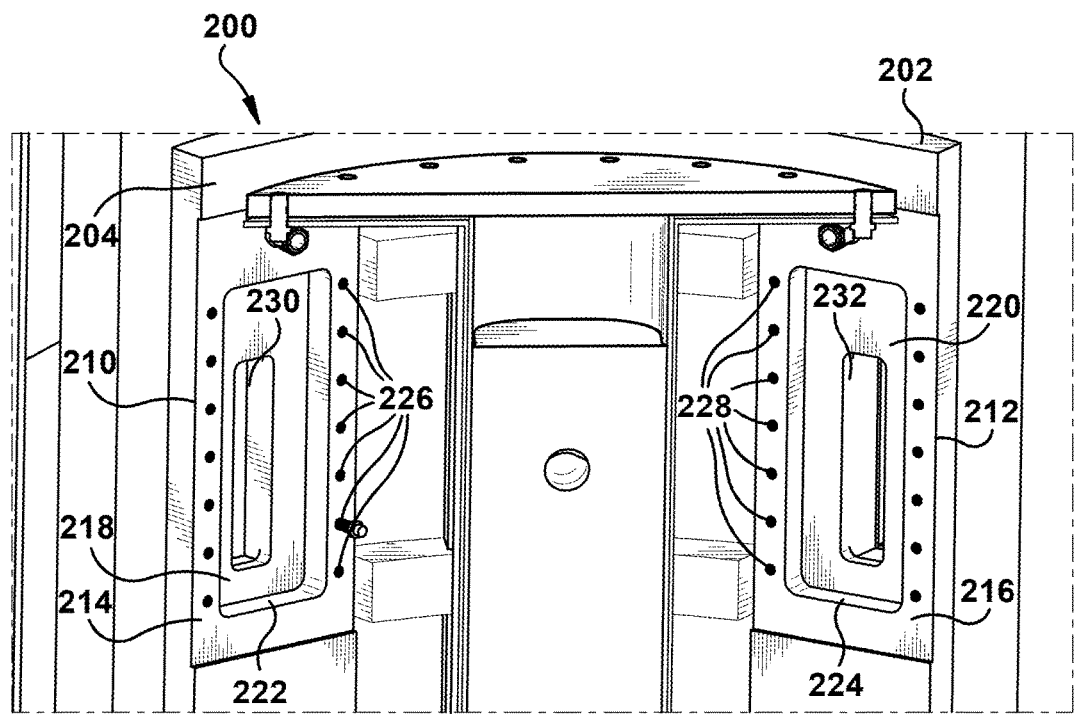
FIG. 2 shows a view of the interior side of the inner barrel of an example exhaust frame.

FIG. 2 shows an upper portion of an interior side 204 of an inner cylinder 202 of an example exhaust frame 200 without the bearing bumpers, e.g., bearing bumpers 184, 186 (FIG. 1). in place. More specifically, two example recessed bumper interfaces 210, 212 are shown. Bumper interfaces 210, 212 may include mounting surfaces 214, 216 surrounding recessed surfaces 218, 220, defining recess sidewalls 222, 224 there between. For example, compatible bearing bumpers (e.g., bearing bumpers 420, 422) may include an extension with a complementary shape to the space defined by recessed surfaces 218, 220 and recess sidewalls 222, 224. In the example shown, bumper interfaces 210, 212 may be built in a thickened panel extending from inner cylinder 202. Mounting surfaces 214, 216 may include a plurality of holes 226, 228 for receiving attachment members, such as bolts, from the bearing bumpers to attach the bearing bumpers to mounting surfaces 214. For example, compatible bearing bumpers may include a wider lateral portion or flange that extends to cover mounting surfaces 214, 216 and provides holes or fasteners that align with plurality of holes 226, 228 in mounting surfaces 214, 216. Bumper interfaces 210, 212 may also define strut channels 230, 232 for providing a fluid path to one or more cooling channels, e.g., cooling channels 126-135 (FIG. 1), within the struts, e.g., struts 117-125 (FIG. 1), of exhaust frame 200.

Figure 3:
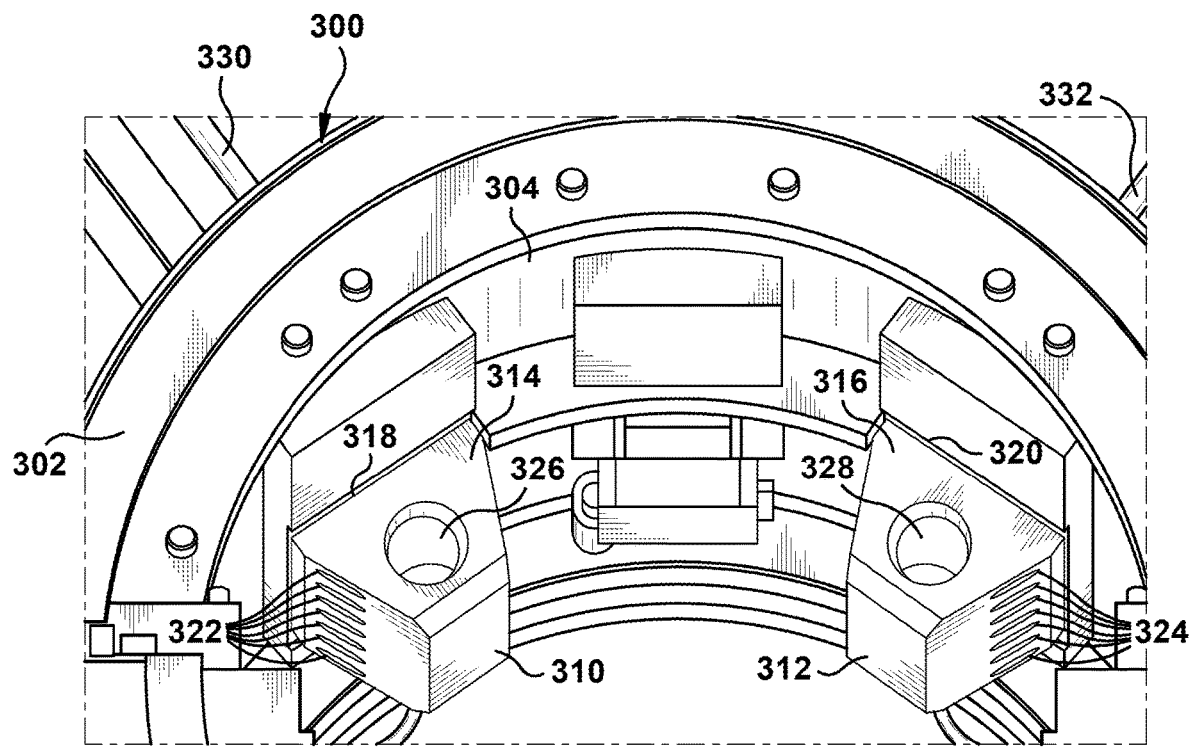
FIG. 3 shows a perspective view of a portion of an exhaust frame with bumper assemblies.

FIG. 3 shows an upper portion of an interior side 304 of an inner cylinder 302 of an example exhaust frame 300 with bearing bumpers 310, 312 in place. At least a portion of bumper bodies 314, 316 may extend radially inward from inner cylinder 302. In some embodiments, interior side 304 may include recessed interfaces similar to those shown in FIG. 2 and bumper bodies 314, 316 may include extensions of a complementary shape (not shown) extending into the recesses of interior side 304. In other embodiments, interior side 304 may provide a mounting surface without a recessed portion and bumper bodies 314, 316 may include substantially flat attachment surfaces 318, 320. Bumper bodies 314, 316 may also include a plurality of holes 322, 324 through which attachment members can be installed to attach bearing bumpers 310, 312 to inner cylinder 302. Note that bumper bodies 314, 316 may include similar pattern of holes to holes 322, 324 on their opposite sides (not shown). Bumper bodies 314, 316 may also define internal passages 326, 328 through which cooling fluids can be directed into cooling channels in one or more exhaust frame struts 330, 332 mounted proximate bearing bumpers 310, 312.

Figure 4:
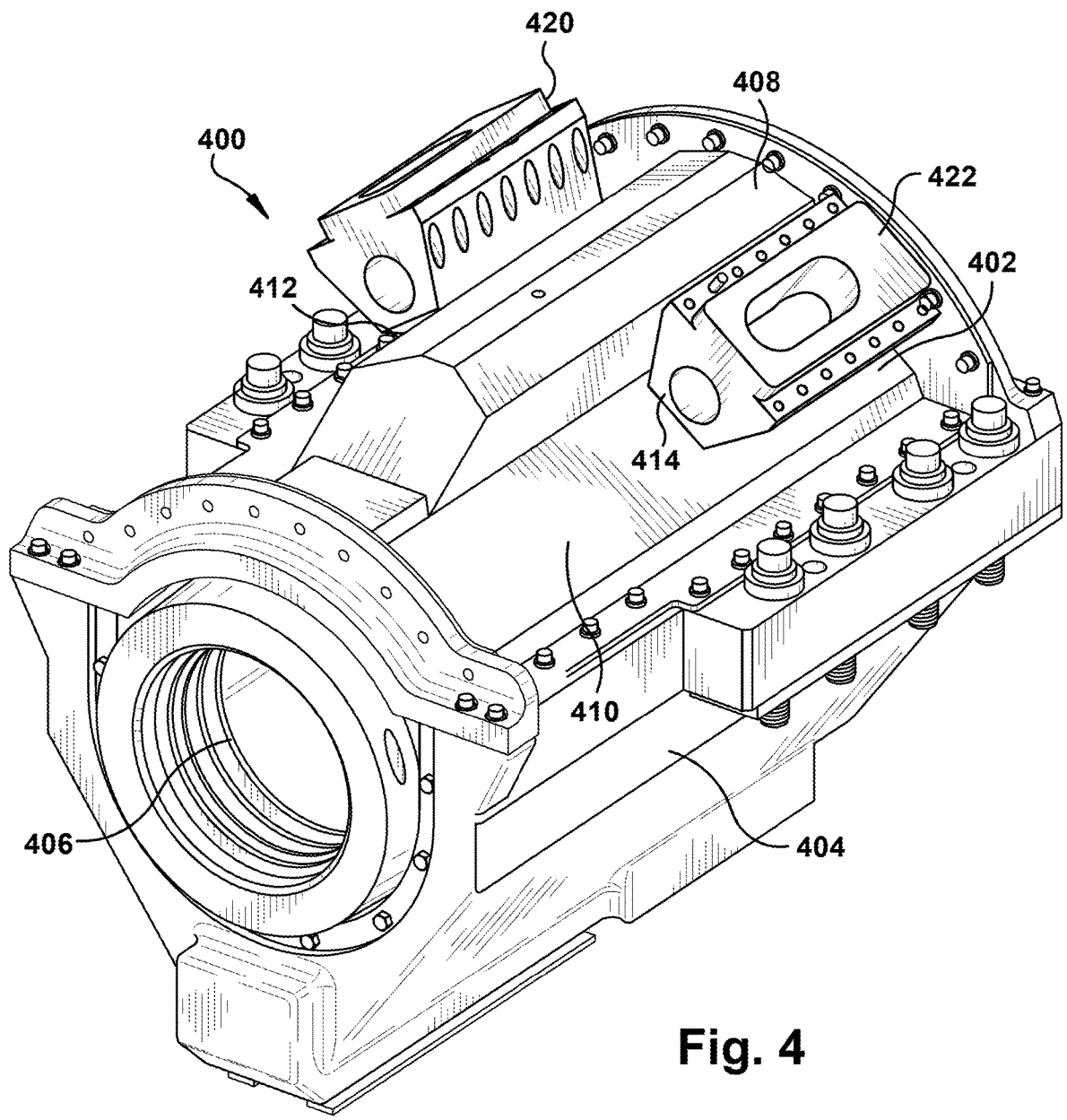
FIG. 4 shows a perspective view of an example bearing housing with bumper assemblies.

FIG. 4 shows an example bearing assembly 400 with bearing bumpers 420, 422 positioned at their respective contact points with upper bearing housing 402. Bearing assembly 400 may include upper bearing housing 402 attached to lower bearing housing 404 and defining a cylindrical shaft space 406 along the axis of bearing assembly 400. Bearing assembly 400 may define an exterior surface 408 facing the interior surfaces (not shown) of an exhaust frame (not shown) when it is installed in the inner cylinder (not shown) of the exhaust frame. Upper bearing housing 402 may define an upper portion 410 of exterior surface 408 providing limited contact points with the inner cylinder of the exhaust frame and, but for bearing bumpers 420, 422 relying, perhaps exclusively, on attachment to lower bearing housing 404. In the embodiment shown, bearing assembly 400 may rely on bearing bumpers 420, 422 to transfer force between upper bearing housing 402 and the upper portion of the exhaust frame to better protect bearing assembly 400 during a blade out event. Bearing bumpers 420, 422 are spaced along the circumference of upper portion 410 of exterior surface 408 to align with specific positions on the exhaust frame that correlate to the location of exhaust frame struts and provide more direct force transfer to the exterior cylinder. Upper bearing housing 402 may include contact surfaces 412, 414 below bearing bumpers 420, 422. Details regarding an example interface, such as may be used between upper bearing housing 402 and bearing bumpers 420, 422 will be described below with regard to FIG. 5.

Figure 5:
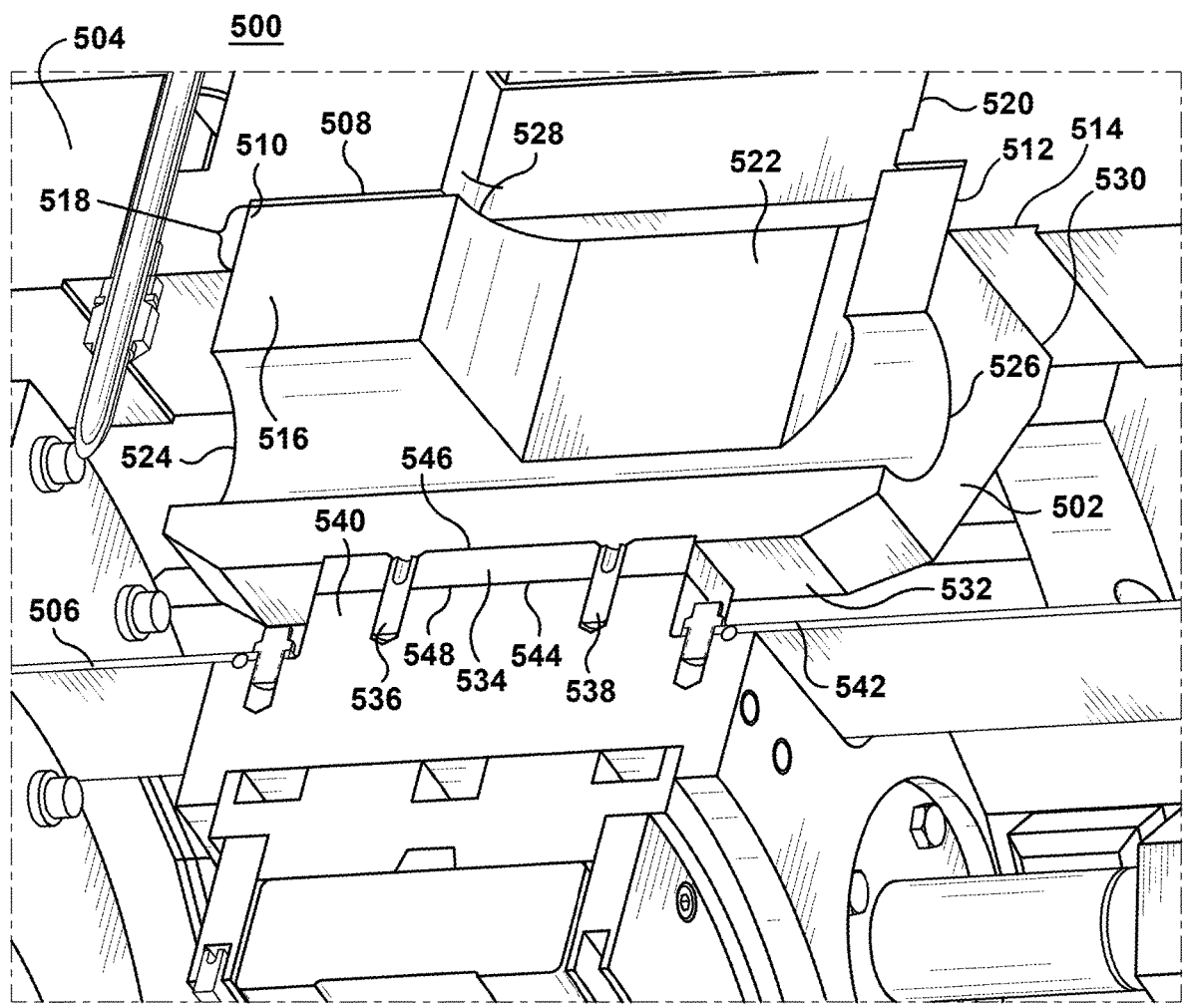
FIG. 5 shows a perspective cutaway view of an example bumper assembly engaging an exhaust frame and bearing housing.

FIG. 5 shows a detailed cutaway view inside an example exhaust frame 500 of a bumper assembly 502 engaging an inner cylinder 504 of exhaust frame 500 and an upper bearing housing 506 of a bearing assembly installed with exhaust frame 500. Inner cylinder 504 may include a recessed surface 508 and recessed sidewalls 510, 512 recessed from interior surface 514. The footprint of recessed surface 508 and the depth of sidewalls 510, 512 define a recess shape. Bumper assembly 502 may include a bumper body 516, shown in cross-section, with an extension portion 518 that has a complementary shape to extend into and substantially fill the recess shape in interior surface 514 of inner cylinder 504. The portion of bumper body 516 in surface contact with inner cylinder 504 may define an attachment surface 530 of bumper assembly 502. A plurality of attachment members (not shown) may attach bumper body 516 to inner cylinder 504 along at least a portion of attachment surface 530. Inner cylinder 504 may further include a strut opening 520 through inner cylinder 504 and connecting to one or more internal features of a strut (not shown) extending from inner cylinder 504 to an outer cylinder. Bumper body 514 may define an internal cavity 522, bearing cavity openings 524, 526, and strut channel opening 528. Bumper body 514 may also include distal surface 532 opposite the attachment surface 530 of bumper assembly 502. Distal surface 532 may be substantially parallel to the adjacent surface of upper bearing housing 506 and the space between them may define a gap. A shim 534 may be used to maintain contact force between distal surface 532 and upper bearing housing 506 by filling a portion of the gap between them. More specifically, the shim may have a thickness similar to the gap width, but a surface area substantially smaller than that of distal surface 532. Shim 534 may be attached to upper bearing housing 506 using attachment members 536, 538. In other embodiments, distal surface 532 may include a contact surface that directly engages upper bearing housing 506. In the example shown, upper bearing housing 506 may include a contact plate 540 extending from upper bearing housing 506 to provide the adjacent contact surface between upper bearing housing 506 and bumper assembly 502. Contact plate 540 may have a height extending above the surrounding upper surface 542 of upper bearing housing 506 and a plate contact surface 544 that is substantially smaller than both upper surface 542 and distal surface 532 of bumper body 514. In some embodiments, contact surface 544 may have a surface area equal to both a bumper contact surface 546 and a bearing contact surface 548 of shim 534.

Figure 6:
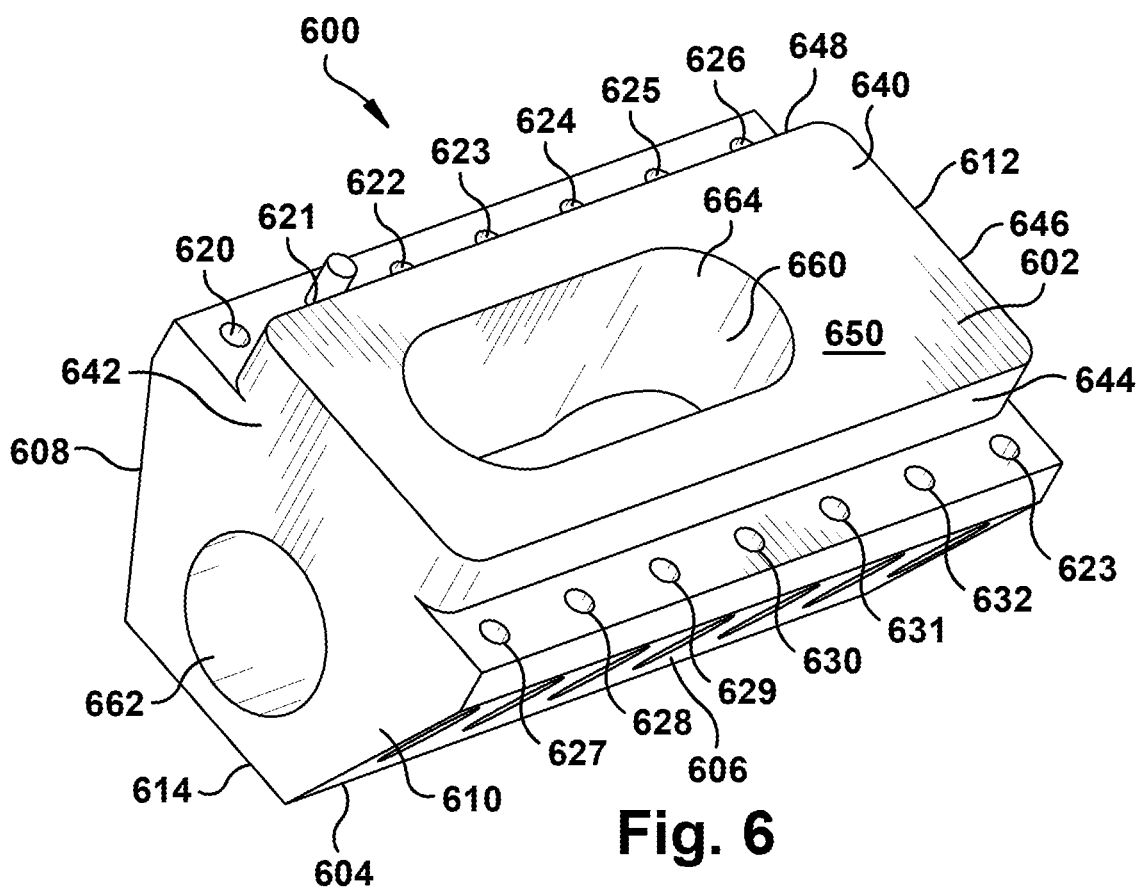
FIG. 6 shows a perspective view of an example bumper body.
Figure 7:
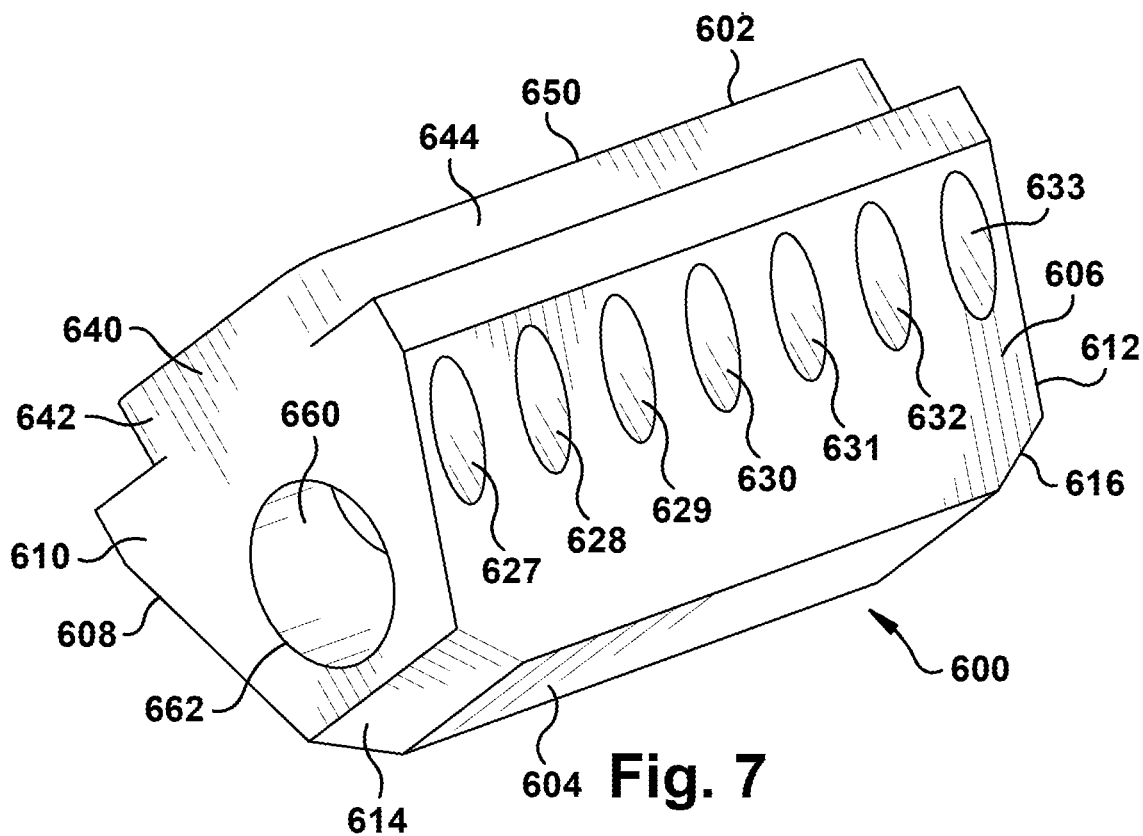
FIG. 7 shows another perspective view of the example bumper body of FIG. 6.

FIGS. 6 and 7 show an example bumper body 600, such as may be used with regard to gas turbine assemblies, exhaust frames, and bearing bumper assemblies described above. Bumper body 600 may be made of steel, cast iron, or another rigid material. Bumper body 600 may include an attachment surface 602 for engaging an exhaust frame and a distal surface 604 for directly or indirectly providing a contact interface with a bearing assembly disposed within the exhaust frame. Attachment surface 602 and distal surface 604 may be generally parallel to one another on opposite sides of bumper body 600. Bumper body 600 may also include first lateral surface 606, second lateral surface 608, first end surface 610, and second end surface 612. First lateral surface 606 and second lateral surface 608 may be on opposite sides of bumper body 600 and are generally angled relative attachment surface 602 and distal surface 604 such that bumper body 600 tapers from attachment surface 602 to distal surface 604. This example configuration results in a generally tapered or trapezoidal cross-section with attachment surface 602 having a larger surface area that distal surface 604. Other configurations may be possible, including but not limited to rectangular and other cross-sectional shapes. First end surface 610 and second end surface 612 may be generally perpendicular to attachment surface 602 and distal surface 604. In some embodiments, first end surface 610 and second end surface 612 may include bevels 614, 616 toward distal surface 604 and further reducing the surface area of distal surface 604 relative to attachment surface 602.

Bumper body 600 may also include a plurality of holes 620, 621, 622, 623, 624, 625, 626, 627, 628, 629, 630, 631, 632, 633 for receiving attachment members to fix bumper body 600 to the exhaust frame. For example, holes 620, 621, 622, 623, 624, 625, 626, 627, 628, 629, 630, 631, 632, 633 may accommodate a bolt assembly that may be secured in matching threaded holes in the exhaust frame. Various other configurations and numbers of holes or other attachment mechanisms are possible. Holes 620, 621, 622, 623, 624, 625, 626, 627, 628, 629, 630, 631, 632, 633 may include openings through attachment surface 602 and may be through holes passing through a portion of bumper body 600 and opening in first lateral surface 606 or second lateral surface 608. On other embodiments, through holes may include openings on distal surface 604 or bumper body 600 may incorporate one or more lateral flanges for through holes or other attachment mechanisms.

In some embodiments, attachment surface 602 may include an insertion portion 640 projecting from and forming part of attachment surface 602. Insertion portion 640 may be designed to insert into a complementary recess in the surface of the exhaust frame for increased lateral stability and/or surface contact. For example, insertion portion 640 may include a shaped projection from attachment surface 602 creating projection side walls 642, 644, 646, 648. Insertion portion 640 may also have a cross-sectional shape and size, such as a rectangle with rounded corners, that is complementary to the recess in the exhaust frame, meaning that insertion portion 640 fits within and substantially fills the matching recess. It may include an interference fit between projection side walls 642, 644, 646, 648 and the side walls of the recess. In some embodiments, a gap may be acceptable between a projection end surface 650 of insertion portion 640 and the adjacent surface of the recess.

In some embodiments, bumper body 600 may provide a pass through for other components or features of the exhaust frame. For example, a bearing bumper located in radial alignment and directly inside the inner cylinder of the exhaust frame relative to one of the struts of the exhaust frame, may benefit from internal cooling structures and require a channel through which to receive cooling fluids, such as air. Bumper body 600 may include a cooling channel 660 with a first opening 662 in first end surface 610 and a second opening 664 in attachment surface 602 and, more specifically, projection end surface 650 of insertion portion 640. First opening 662 may connect to second opening 664 through an internal channel within bumper body 600. Bumper body 600 may also include a third opening (not shown) in second end surface 612. Other configurations of channels, openings, and shaping of bumper body 600 may be made to accommodate other features, subsystems, and available space between the exhaust frame and the bearing assembly in any given design.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A gas turbine assembly comprising:
   an exhaust frame having an inner cylinder, an outer cylinder, and a plurality of struts extending between the inner cylinder and the outer cylinder;
   a bearing housing disposed concentrically within the inner cylinder of the exhaust frame, surrounding a shaft, and operatively coupled to the exhaust frame;
   at least one primary attachment member coupling the exhaust frame to the bearing housing; and
   a bumper assembly disposed between an interior surface of the inner cylinder of the exhaust frame and an exterior surface of the bearing housing, the bumper assembly having an attachment surface attached to the exhaust frame and a bearing contact surface that engages the bearing housing during a blade out event.

2. The gas turbine assembly of claim 1, wherein the exhaust frame defines a bumper recess with a recess shape and the bumper assembly includes an insertion portion with an insertion shape complimentary to the recess shape.

3. The gas turbine assembly of claim 1, further comprising a plurality of bumper attachment members attaching the bumper assembly to the exhaust frame.

4. The gas turbine assembly of claim 1, wherein the bearing contact surface of the bumper assembly has a normal operating state that defines a gap between the bearing contact surface and an adjacent contact surface of the bearing housing and wherein the bumper assembly further comprises a shim member disposed in the gap between the bearing contact surface and the adjacent contact surface wherein an event force is transferred between the bearing contact surface and the adjacent contact surface through the shim member during the blade out event.

5. The gas turbine assembly of claim 4, wherein the adjacent contact surface is on a raised contact plate extending from the exterior surface of the bearing housing.

6. The gas turbine assembly of claim 1, wherein the bumper assembly is aligned radially with at least one of the plurality of struts extending between the inner cylinder and the outer cylinder.

7. The gas turbine assembly of claim 1, wherein the bumper assembly is one of a plurality of bumper assemblies disposed between the interior surface of the exhaust frame and the exterior surface of the bearing housing, each of the plurality of bumper assemblies having attachment surfaces for attaching to the exhaust frame and bearing contact surfaces that engage the bearing housing during the blade out event.

8. The gas turbine assembly of claim 1, wherein the bearing housing includes a first bearing portion and a second bearing portion, the first bearing portion including at least one adjacent contact surface for receiving an event force from the bearing contact surface of the bumper assembly and the second bearing portion engaging the at least one primary attachment member and the exhaust frame.

9. The gas turbine assembly of claim 1, wherein the bumper assembly includes a bumper body that translates an event force between the exhaust frame and the bearing housing and wherein the bumper body has a tapered cross-section perpendicular to the attachment surface and the bumper contact surface such that the attachment surface has an attachment surface area engaged with the exhaust frame that is greater than a contact surface area of the bearing contact surface.

10. The gas turbine assembly of claim 1, wherein the bumper assembly aligns radially with a first strut of the plurality of struts of the exhaust frame and the bumper assembly includes a bumper body defining cooling channels that align with cooling channels in the first strut.

11. An exhaust frame assembly comprising:
an exhaust frame having an inner cylinder, an outer cylinder, and a plurality of struts extending between the inner cylinder and the outer cylinder, the exhaust frame defining an interior space within the inner cylinder for receiving a bearing housing;
at least one primary attachment member coupling the exhaust frame to the bearing housing; and
a bumper assembly disposed on an interior surface of the inner cylinder of the exhaust frame and extending into the interior space, the bumper assembly having an attachment surface attached to the exhaust frame and a bearing contact surface that engages the bearing housing during a blade out event.

12. The exhaust frame assembly of claim 11, wherein the exhaust frame defines a bumper recess with a recess shape and the bumper assembly includes an insertion portion with an insertion shape complimentary to the recess shape.

13. The exhaust frame assembly of claim 11, further comprising a plurality of bumper attachment members attaching the bumper assembly to the exhaust frame.

14. The exhaust frame assembly of claim 11, wherein the bumper assembly is one of a plurality of bumper assemblies disposed on the interior surface of the exhaust frame, each of the plurality of bumper assemblies having attachment surfaces for attaching to the exhaust frame and bearing contact surfaces that engage the bearing housing during the blade out event.

15. The exhaust frame assembly of claim 11, wherein the bumper assembly includes a bumper body that translates an event force between the exhaust frame and the bearing housing and wherein the bumper body has a tapered cross-section perpendicular to the attachment surface and the bearing contact surface such that the attachment surface has an attachment surface area engaged with the exhaust frame that is greater than a contact surface area of the bearing contact surface.

16. The exhaust frame assembly of claim 11, wherein the bumper assembly aligns radially with a first strut from the plurality of struts in the exhaust frame and the bumper assembly includes a bumper body defining cooling channels that align with cooling channels in the first strut.

17. A bumper assembly comprising:
a bumper body, the bumper body having an attachment surface for attaching to an exhaust frame and a bearing contact surface that engages a bearing housing during a blade out event;
a plurality of bumper attachment members that attach the bumper assembly to the exhaust frame; and,
a shim member adjacent the bearing contact surface between the bearing contact surface and the bearing housing.

18. The bumper assembly of claim 17, wherein the bumper assembly includes an insertion portion with an insertion shape complimentary to a recess shape in the exhaust frame, the insertion portion defining at least a portion of the attachment surface and including a distal surface and a plurality of lateral surfaces.

19. The bumper assembly of claim 17, wherein the bumper assembly translates an event force between the exhaust frame and the bearing housing and wherein the bumper body has a tapered cross-section perpendicular to the attachment surface and the bearing contact surface such that the attachment surface has an attachment surface area engaged with the exhaust frame that is greater than an contact surface area of the bearing contact surface.

20. The bumper assembly of claim 17, wherein the bumper body defines at least one cooling channel that aligns with cooling channels in a strut in the exhaust frame.

* * * * *